United States Patent [19]

Sanders et al.

[11] Patent Number: 5,544,545
[45] Date of Patent: Aug. 13, 1996

[54] STEERING WHEEL WITH TAPERED HUB SLEEVE

[75] Inventors: Fritz Sanders, Livonia; Gregory F. Exner, Woodhaven, both of Mich.

[73] Assignee: United Technologies Automotive, Inc., Dearborn, Mich.

[21] Appl. No.: 199,557

[22] Filed: Feb. 22, 1994

[51] Int. Cl.⁶ .................... B62D 1/04; G05G 1/10
[52] U.S. Cl. ............................. 74/552; 23/894.1
[58] Field of Search ............... 74/552, 558; 29/894.1

[56] References Cited

U.S. PATENT DOCUMENTS

| | | | |
|---|---|---|---|
| 1,720,142 | 7/1929 | O'Connor | 74/552 |
| 3,540,304 | 11/1970 | Weiss | 74/552 |
| 4,586,397 | 5/1986 | Kokubu | 74/552 |
| 4,738,157 | 4/1988 | Nishijima et al. | 74/552 |
| 4,759,231 | 7/1988 | Kurata et al. | 74/552 |
| 4,771,650 | 9/1988 | Kerner | 74/552 |
| 4,777,840 | 10/1988 | Endo et al. | 74/552 |
| 4,819,961 | 4/1989 | Henigue | 74/552 |
| 4,920,821 | 5/1990 | Shinto et al. | 74/552 |
| 4,920,822 | 5/1990 | Abiko | 74/552 |
| 4,938,094 | 7/1990 | Cochard | 74/552 |
| 4,946,194 | 8/1990 | Maeda et al. | 74/552 |
| 5,067,367 | 11/1991 | Hashiba et al. | 74/552 |
| 5,070,742 | 12/1991 | Sakane et al. | 74/552 |
| 5,085,097 | 2/1992 | Harata et al. | 74/552 |
| 5,090,731 | 2/1992 | Fujita et al. | 74/552 |
| 5,134,899 | 8/1992 | Nagata et al. | 74/552 |
| 5,136,895 | 8/1992 | Ocard et al. | 74/552 |
| 5,178,036 | 1/1993 | Haldenwanger et al. | 74/552 |

FOREIGN PATENT DOCUMENTS

| | | | |
|---|---|---|---|
| 2618115 | 1/1989 | France | 74/552 |
| 2618116 | 1/1989 | France | 74/552 |
| 3535768 | 4/1986 | Germany | 74/552 |
| 3727638 | 3/1988 | Germany | 74/552 |
| 3925991C1 | 1/1991 | Germany | 74/552 |
| 59-29566 | 2/1984 | Japan | 74/552 |
| 62-214053 | 9/1987 | Japan . | |

OTHER PUBLICATIONS

"Diecast Armature", Drawing No. A 1610, UTA Clifford Ltd. drawing, (prior to Feb. 1994).

*Primary Examiner*—Vinh T. Luong
*Attorney, Agent, or Firm*—Harness, Dickey & Pierce, P.L.C.

[57] ABSTRACT

A steering wheel has a hub sleeve with an inside surface defining a longitudinal bore with at least a portion of the inside surface having a longitudinally oriented substantially tapered configuration disposed within a section of the bore closest to a vehicle driver. The steering wheel further includes a hub having an inside face and an outside face wherein the sleeve is formed as a single piece with the hub. The sleeve and hub have an inside surface with a longitudinal bore such that at least a portion of the inside surface of the sleeve further has a longitudinally oriented tapered configuration. The tapered portion is longitudinally disposed within a section of the bore closest to the inside face and a flat first locking sleeve formation is positioned along the tapered portion longitudinally adjacent an end of the bore.

28 Claims, 5 Drawing Sheets

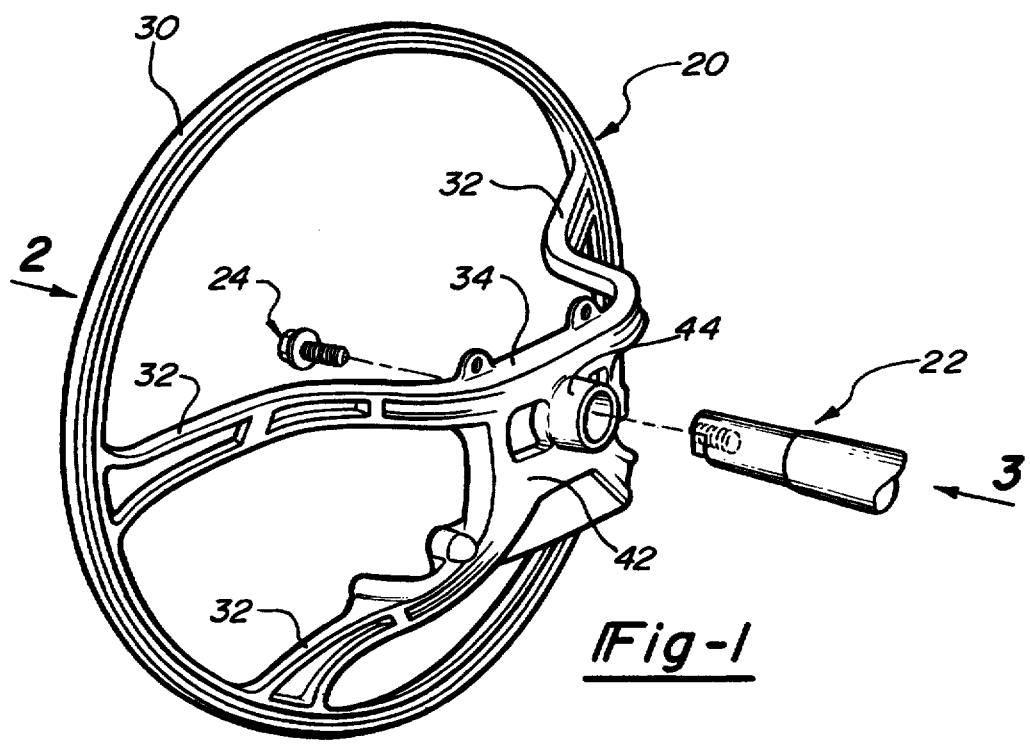
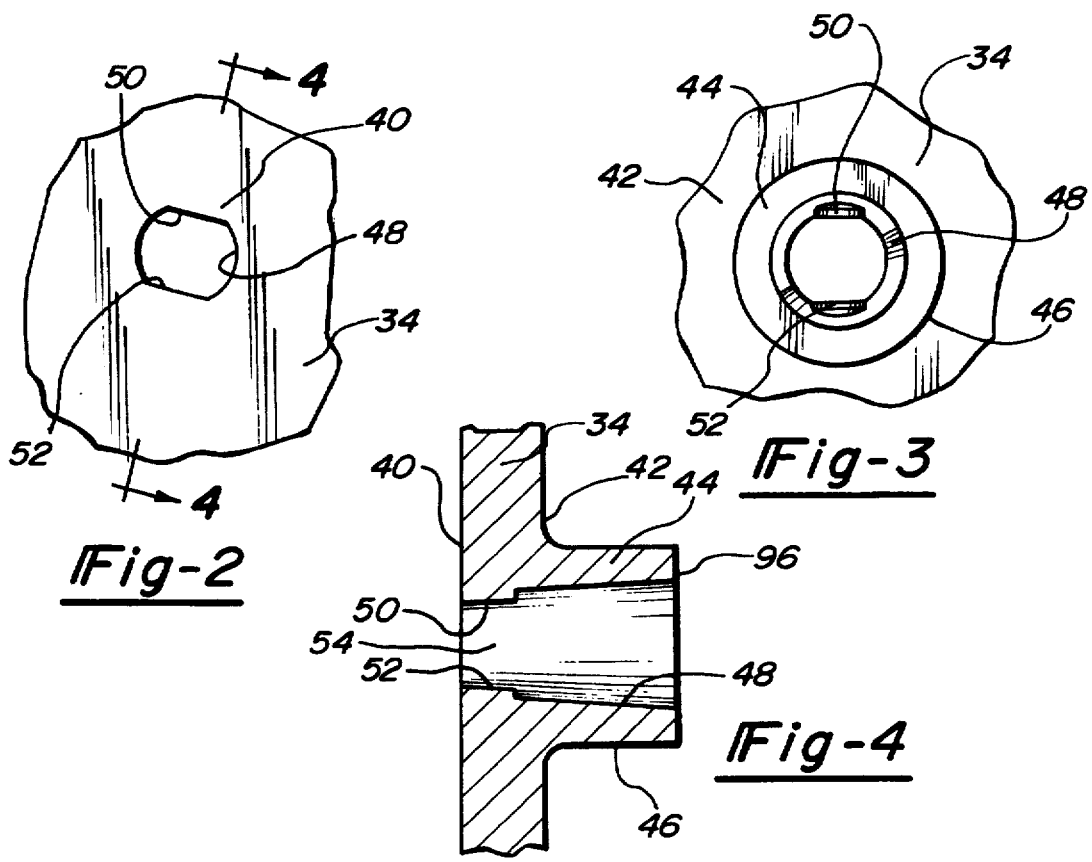

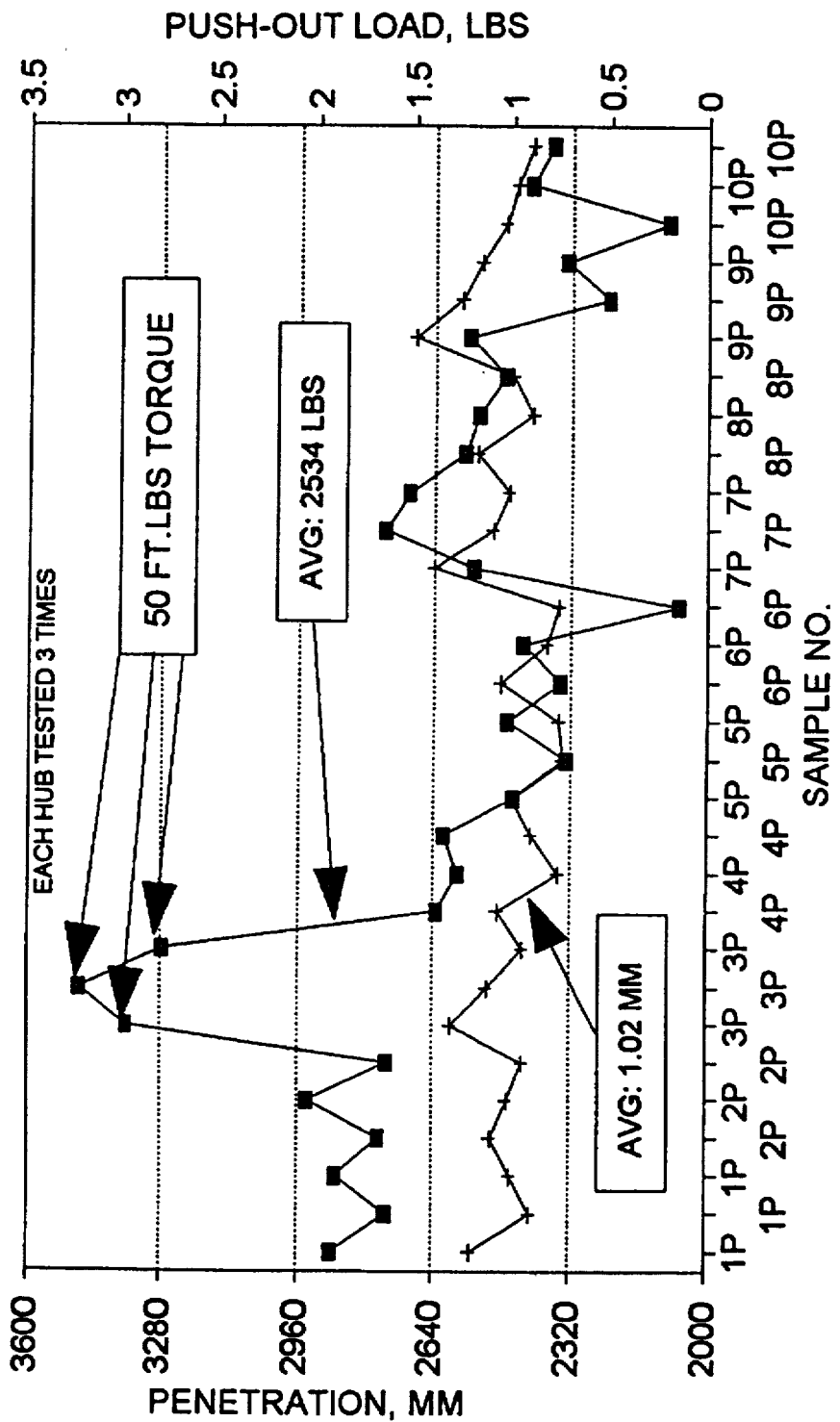

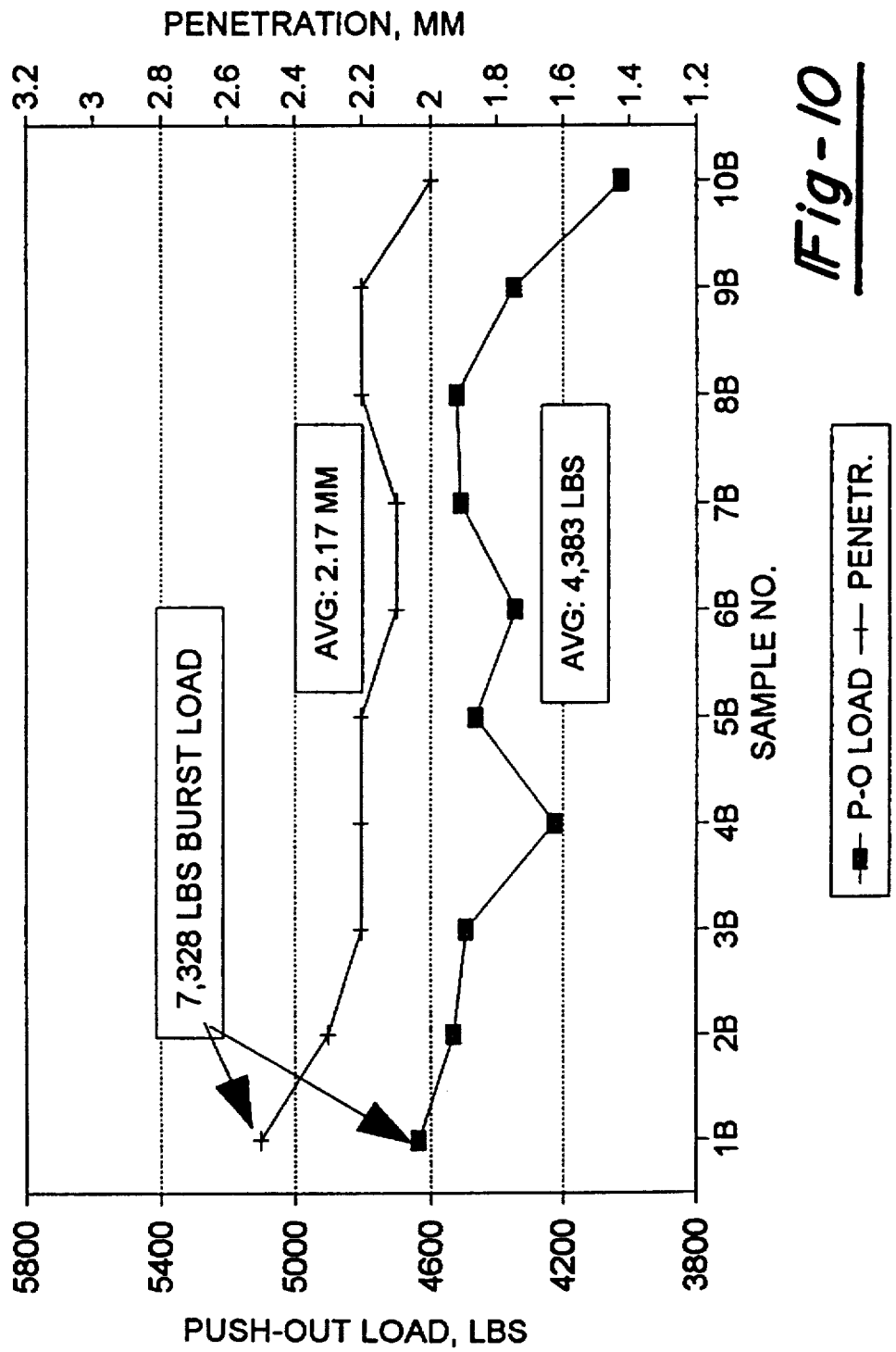

5,544,545

STEERING WHEEL WITH TAPERED HUB SLEEVE

BACKGROUND OF THE INVENTION

This invention relates generally to steering wheels and specifically to a steering wheel having a tapered hub sleeve therein.

In steering wheels for automotive vehicles, it is common to have a circular rim, a plurality of spokes and a central hub. The rim and spokes are usually encapsulated within a polymeric material. Traditionally, the rim is made from tubular steel. The hub is made from stamped steel and the spokes are stamped extension members or formed steel rods. The spokes are welded to the rim and the hub.

Furthermore, an annular hub sleeve is welded to the hub. The hub sleeve has a longitudinal bore with a plurality of longitudinally oriented broached splines therein. The sleeve serves to receive a mating steering shaft which is then longitudinally bolted to the hub. Typically, the inside surface surrounding the bore of the sleeve has a tapered portion and a substantially cylindrical portion. The cylindrical portion contains the splines. Moreover, the cylindrical portion is located closest to an inside face of the hub which faces the vehicle driver whereas the tapered portion is located furthest from the driver within the bore. Examples of such steering wheels are shown in the following U.S. Pat. No. 5,134,899 entitled "Steering Wheel Having Boss and Boss Plate Relative Rotation Prevention Means" which issued to Nagata et al. on Aug. 4, 1992; U.S. Pat. No. 5,090,731 entitled "Steering Wheel" which issued to Fujita et al. on Feb. 25, 1992; and, U.S. Pat. No. 4,738,157 entitled "Steering Wheel" which issued to Nishijima et al. on Apr. 19, 1988.

More recently, another steering wheel construction employs integrally cast spokes and a hub. The spokes merely encapsulate portions of a separate tubular rim. This version is disclosed in the following U.S. Pat. No. 5,085,097 entitled "Steering Wheel Core" which issued to Harata et al. on Feb. 4, 1992; U.S. Pat. No. 5,070,742 entitled "Steering Wheel" which issued to Sakane et al. on Dec. 10, 1991; and, U.S. Pat. No. 4,920,821 entitled "Steering Wheel for Vehicle" which issued to Shinto et al. on May 1, 1990. However, the hub sleeve is still a separately splined part that is inserted within or otherwise attached to the cast hub. The sleeve is commonly made from steel while the hub is usually made from a magnesium-based alloy. The sleeve is traditionally a separate part due to the conventional design and material limitations which have often proven inadequate to meet the various required strength standards. Other variations include a rim, spokes, and hub being integrally cast as a single unit. However, this steering wheel also has the aforementioned deficiencies.

A further cast steering wheel hub is known to have been manufactured and sold in Europe. In this steering wheel, a hub sleeve is integrally cast to the hub and shares a common casting material. This European sleeve has an inside surface defining a longitudinal bore comprised of a substantially constant hexagonally-shaped cross sectional portion located adjacent to an inside face of the hub closest to the vehicle driver and a hexagonally tapered cross sectional portion adjacent to an outside face of the hub.

The aforementioned separate hub sleeves are expensive to machine. They are also expensive to weld or insert within the hub. Furthermore, additional assembly labor and capital equipment are required to produce and attach these traditional sleeves.

SUMMARY OF THE INVENTION

In accordance with the present invention, the preferred embodiment of a new and useful steering wheel has a hub sleeve with an inside surface defining a longitudinal bore with at least a portion of the inside surface having a longitudinally oriented substantially tapered configuration disposed within a section of the bore closest to a vehicle driver. In another aspect of the present invention, the inside surface of the hub sleeve has at least one locking sleeve formation positioned along the otherwise tapered inside surface. In a further aspect of the present invention, the hub and the hub sleeve are integrally formed from the same material. In still another aspect of the present invention, the substantially tapered inside surface has a substantially frusto-conical shape.

The present invention is advantageous over conventional steering wheels in that the hub sleeve of the present invention adequately prevents excessive penetration of a shaft through the sleeve in a crash impact situation. Furthermore, the present invention does not require expensive secondary machining operations. The sleeve of the present invention can be integrally cast with the hub from common materials thereby eliminating the expensive, process sensitive, and time-consuming assembly of the traditionally separate hub sleeve and hub. Furthermore, the casting cycle time of the present invention steering wheel is faster than most traditional cast steering wheels since a homogeneous hub and sleeve are employed. The present invention sleeve may also be manufactured from a lighter weight material as compared to traditional hub sleeves. Additional advantages and features of the present invention will become apparent from the following description and appended claims, taken in conjunction with the accompanying drawings.

BRIEF DESCRIPTION OF THE DRAWINGS

FIG. 1 is an exploded perspective view of a preferred embodiment of a steering wheel, steering shaft and bolt of the present invention;

FIG. 2 is a fragmentary true view, taken in the direction of arrow 2 of FIG. 1, of the present invention steering wheel;

FIG. 3 is a fragmentary true view, taken in the direction of arrow 3 of FIG. 1, of the present invention steering wheel;

FIG. 4 is a fragmentary cross sectional view, taken along line 4—4 of FIG. 2, of the present invention steering wheel;

FIG. 9 is a chart graphically representing pull down/push out load and shaft penetration test results of the preferred embodiment of the present invention steering wheel and shaft of FIG. 1; and FIG. 10 is a chart graphically representing burst load test results, including shaft penetration and removal force, of the preferred embodiment of the present invention steering wheel of FIG. 1.

DETAILED DESCRIPTION OF THE PREFERRED EMBODIMENT

Figure 7:
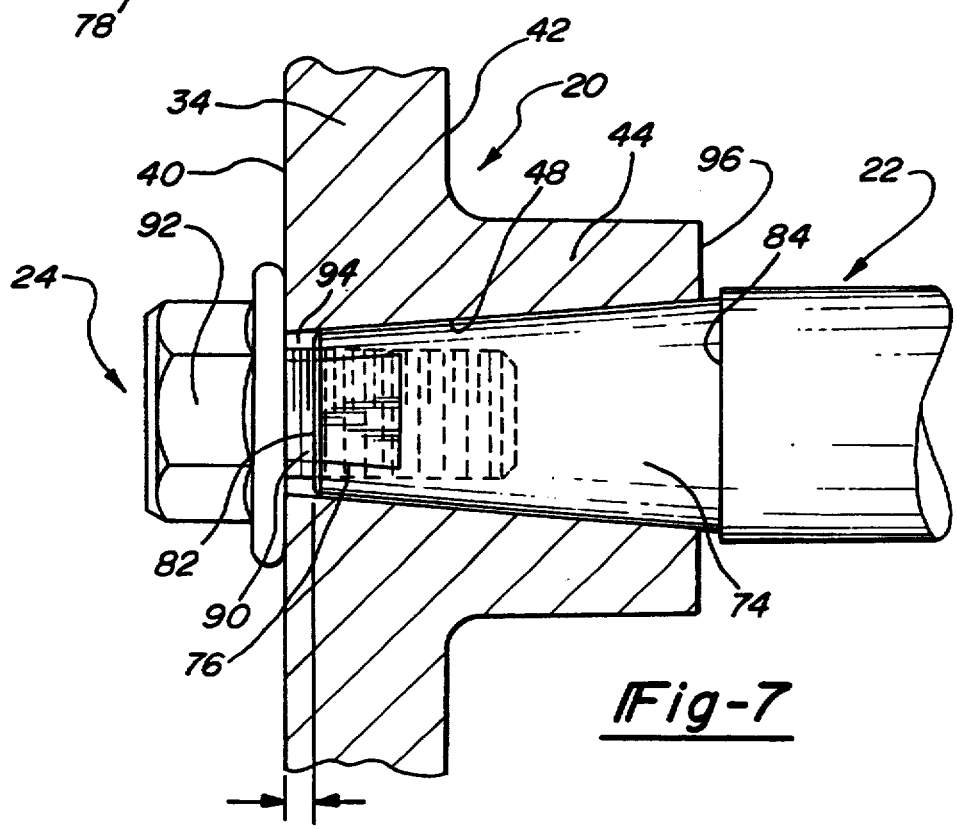
FIG. 7 fragmentary side elevational view, partially in section similar to that of FIG. 4, showing the present invention steering wheel, shaft and bolt assembled together.

The preferred embodiment of a steering wheel 20, steering shaft 22 and bolt 24 of the present invention are shown in FIGS. 1 and 7. Steering wheel 20, shaft 22 and bolt 24 are preferably used in an automotive vehicle but may also be employed in a boat, airplane or other movable vehicle.

Steering wheel 20 has a circular rim 30 with a substantially U-shaped cross sectional configuration. Steering wheel 20 also has a plurality of spokes 32 and a centrally located hub 34. Rim 30, spokes 32 and hub 34 are integrally cast from a magnesium based alloy such as AM 50B which can be purchased from Dow Chemical Company. However, of course other malleable (having an elongation percentage greater than 12%) magnesium or aluminum based alloys may be found suitable. Hub 34 is further defined by an inside face 40 and an oppositely disposed and substantially parallel outside face 42. Inside face 40 substantially faces rearward toward a vehicle driver while outside face 42 is oriented to substantially face forward in the automotive vehicle. A substantially cylindrical outside surface 46 of an annular hub sleeve 44 projects from outside face 42 of hub 34. This can best be observed in FIGS. 2 through 4. Sleeve 44 further has an inside surface 48 which defines a longitudinally oriented bore. Inside surface 48 of sleeve 44 has a substantially continuous longitudinally oriented frusto-conically tapered configuration interrupted by first and second locking sleeve formations, respectively 50 and 52, which span inside a segment of the otherwise tapered inside surface 48. Accordingly, it is significant that a tapered portion 54 of inside surface 48 is disposed within a section of the bore closest to inside face 40 of hub 34 (e.g., closest to the vehicle driver). Inside surface 48 is shown with a 1:12 ratio of taper, however, a less steep ratio of taper, such as 1:5, would be preferable if packaging space is available for a correspondingly larger diameter shaft 22 (see FIG. 1). The 1:12 ratio (4.7636°) of taper of inside surface 48 is substantially greater than the normal die pull angle required for tool separation. Also, the thicker the cross sectional thickness of sleeve 44, as measured between inside surface 48 and outside surface 46, the better the strength performance.

It is significant to note that hub sleeve 44 is integrally cast with hub 34 thereby eliminating the need for a separately manufactured and installed conventional steel sleeve. Moreover, broached splines are not required along inside surface 48 of sleeve 44 since locking sleeve formations 50 and 52 are also integrally cast with sleeve 44 and hub 34.

Figure 5:
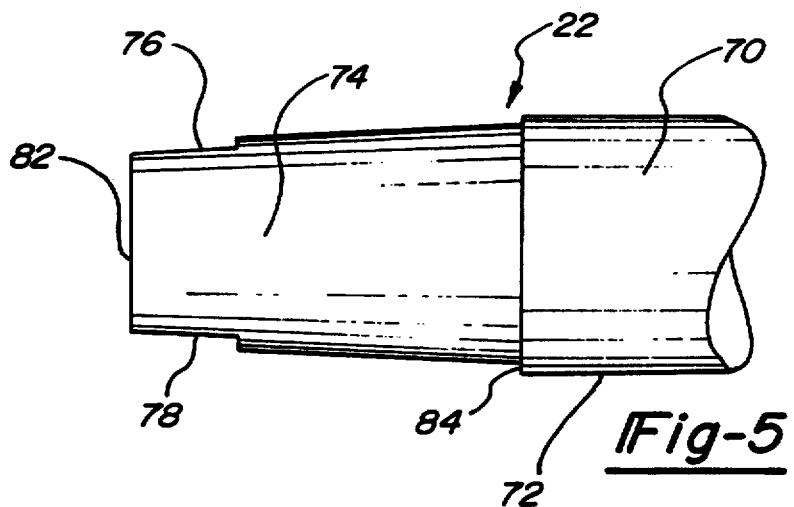
FIG. 5 is a side elevational view of the shaft of the present invention of FIG. 1.
Figure 6:
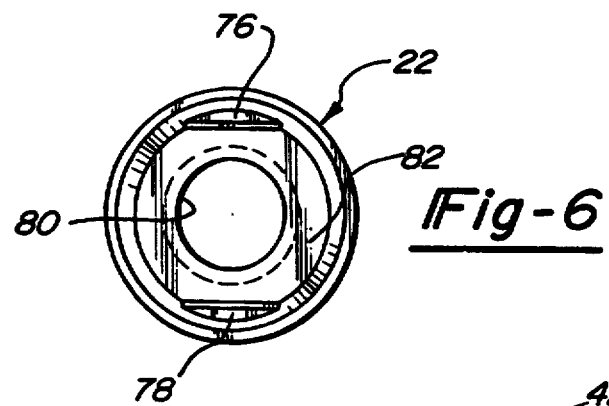
FIG. 6 is an end elevational view of the present invention shaft of FIG. 5.

A preferred embodiment of the present invention shaft 22 is shown in FIGS. 5 through 7. Shaft 22 contains a nominal median section 70 which is solid and has a substantially cylindrical peripheral surface 72. Shaft 22 further has a tapered portion 74 which matches inside surface 48 of sleeve 44. Shaft 22 also has first and second locking shaft formations, respectively 76 and 78, which cut across the otherwise tapered portion 74. Locking shaft formations 76 and 78 correspond with locking sleeve formations 50 and 52 (see FIG. 4) of sleeve 44. A threaded aperture 80 projects within a distal end 82 of shaft 22. Furthermore, an annular step 84 radially protrudes in a perpendicular manner around shaft 22 axially proximate with an intersection between tapered portion 74 and nominal section 70. Shaft 22 is made from conventional materials.

Referring to FIG. 7, shaft 22 is affixed within sleeve 44 by engagement of a threaded shank 90 of bolt 24 with internally threaded aperture 80 (see FIG. 6) of shaft 22. A head 92 of bolt 24 abuts against inside face 40 of hub 34 when bolt 24 is tightened to shaft 22. Bolt 24 is preferably tightened to approximately 35 foot-pounds of torque. When assembled, a gap 94 is provided between distal end 82 of shaft 22 and head 92 of bolt 24. The longitudinal distance between step 84 and the adjacent segment 96 of sleeve 44 should be less than gap 94. A dimension of 3.5 millimeters has been found sufficient for gap 94. Gap 94 is critical to prevent extreme penetration of shaft 22 within sleeve 44 and to prevent distal end 82 of shaft 22 from bottoming out against head 92 of bolt 24 during normal installation. This ensures a secure interference fit between tapered portion 74 of shaft 22 and inside surface 48 of sleeve 44. Moreover, the longitudinal distance between step 84 and segment 96 is intended to insure against excessive penetration of shaft 22 through sleeve 44 in a crash impact situation.

Figure 8:
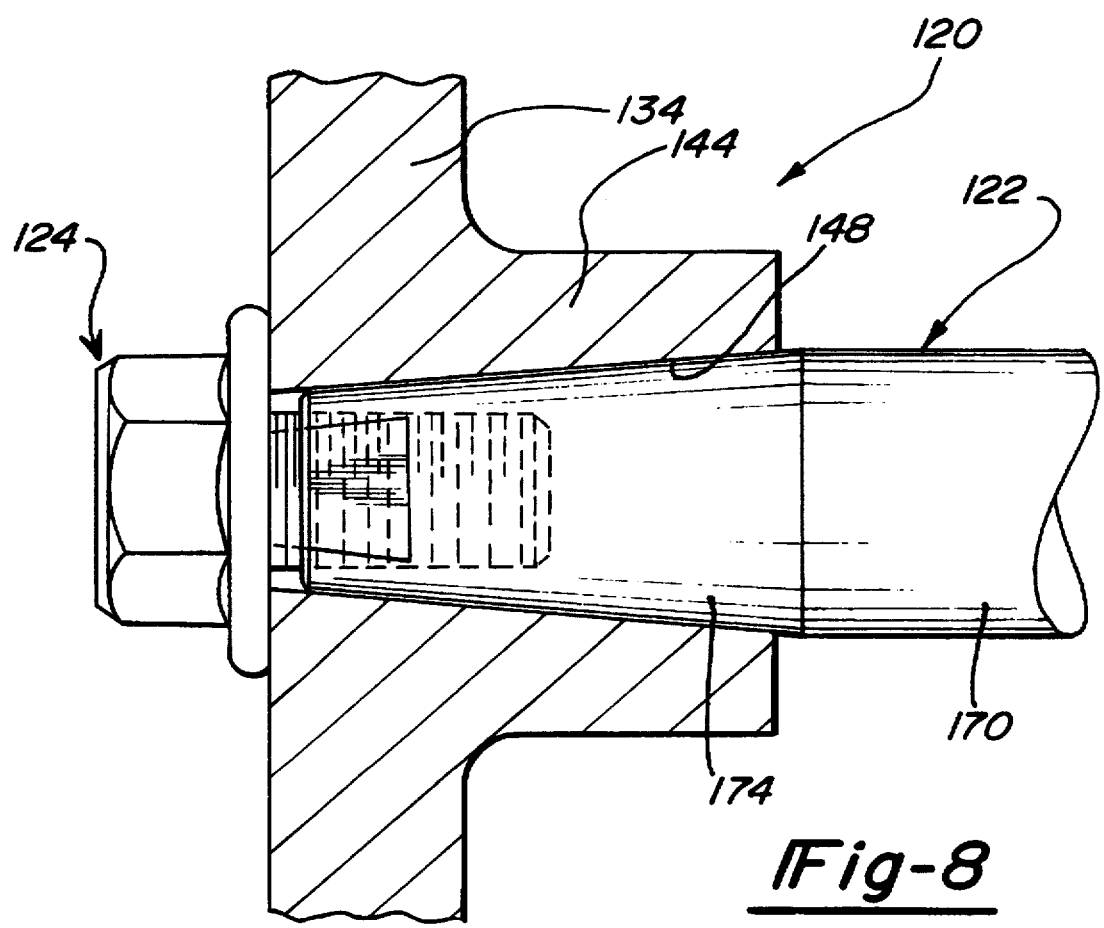
FIG. 8 is a view similar to that of FIG. 7, showing an alternate embodiment shaft assembled to the preferred embodiment steering wheel and bolt of the present invention.

In FIG. 8, an alternate embodiment of a shaft 122 of the present invention is shown affixed to a sleeve 144 and hub 134 of a steering wheel 120 by threaded engagement of a bolt 124. Steering wheel 120 and bolt 124 are substantially the same as that of the preferred embodiment. However, shaft 122 does not have a step at the intersection of a tapered portion 174 and a nominal portion 170. This design is better suited for more gentle taper ratios of an inside surface 148 of sleeve 144 (e.g., 1:5 taper ratio).

FIG. 9 graphically demonstrates the results of a series of pull down/push out load and shaft penetration tests on the preferred embodiment of shaft 22 (see FIG. 7) when inserted within steering wheel 20 of the present invention. For these tests, shaft 22 was inserted into sleeve 44 and bolt 24 was torqued to 35 foot-pounds; the bolt applies the pull down torque. However, sample 3P was torqued to 50 foot-pounds. Gap 94 was measured before and after installation and torquing of bolt 24. This established the total shaft penetration within sleeve 44. Bolt 24 was then removed. An Instron machine was then used to measure the shaft retention load by pushing shaft 22 out of sleeve 44 opposite the direction of installation. Each test was repeated twice. The average listed push out load and penetration does not include sample 3P.

FIG. 10 graphically depicts a burst load test including shaft penetration and removal force (push out load). The test procedure was as follows: Shaft 22 (see FIG. 7) was installed within sleeve 44 by hand and gap 94 was then measured. Twenty-five newtons of preload were then applied to the end of shaft 22 opposite from distal end 82 with sleeve 44 remaining stationary. The load measuring device was then reset to zero. A 30 KN (6744 pound) load was then applied to the shaft end opposite distal end 82. However, a 7,328 pound load was applied only to sample 1B. Gap 94 was then remeasured (it should not exceed 2.5 millimeters) and an Instron machine was then used to measure the push-out load required to push shaft 22 out of sleeve 44 opposite the direction of installation. The average listed push out load and penetration does not include sample 1B.

It is apparent from the aforementioned description and test results that the present invention advantageously accomplishes a "locking function" between the sleeve and the shaft (requiring a minimum of 2,000 pounds of pull off load with 35 foot-pounds of installation torque supplied to the bolt) as a supplemental secondary method of retention even if the primary fastener (the bolt) inadvertently loosens. Furthermore, the more compliant the material and geometry, the greater the intimate interface between the sleeve and the shaft. Thus, wobble and chucking are avoided while the present invention is more tolerant of slight dimensional variation.

While the preferred embodiment of this steering wheel has been disclosed, it will be appreciated that various modifications may be made without departing from the present invention. For example, a sleeve may project substantially rearward from an inside face of a hub toward a vehicle driver. Accordingly, a tapered portion is located closest to the vehicle driver within the sleeve inside surface. Furthermore, a shaft may be externally threaded near a distal end thereof for attachment to a hub with an internally threaded nut or other suitable fastening means. A shaft may alternately be affixed to a sleeve by a transversely engaging bolt or pin. The sleeve of the present invention may also be employed in combination with a traditionally stamped hub with separately welded spokes and a rim extending therefrom. Various materials have been disclosed in an exemplary fashion, however, a variety of other materials, such as steel, may of course be employed. It is intended by the following claims to cover these and any other departures from the disclosed embodiments which fall within the true spirit of this invention.

The invention claimed is:

1. A steering wheel comprising:

a hub having an inside face and an outside face;

a sleeve being formed as a single piece with said hub, said sleeve and said hub having an inside surface with a longitudinal bore, at least a portion of said inside surface of said sleeve further having a longitudinally oriented tapered configuration said tapered portion being longitudinally disposed with a section of said bore closet to said inside face; and a flat first locking sleeve formation positioned along said tapered portion longitudinally adjacent an end of said bore.

2. The steering wheel claim 1 further comprising:

a second locking sleeve formation defined by a second flat configuration positioned along said otherwise tapered inside surface of said sleeve radially opposite from said locking sleeve formation, whereas said inside surface of said sleeve longitudinally proximate with said first and second locking sleeve formations is defined by a pair of radially opposing flat segments joined by a pair of radially opposing partially circular segments of said taper.

3. The steering wheel of claim 2 wherein:

said first locking sleeve formation longitudinally extends along a portion of said inside surface of said sleeve adjacent to said inside face of said hub.

4. The steering wheel of claim 1 wherein:

said sleeve is integrally created with said hub and is comprised of the same rigid, metallic material.

5. The steering wheel of claim 4 wherein:

said sleeve and said hub are cast from a magnesium based material.

6. The steering wheel of claim 4 wherein:

said sleeve and said hub are cast from an aluminum based material.

7. The steering wheel of claim 1 further comprising:

said shaft having a substantially tapered portion thereof proximate with a distal end, said tapered portion being insertably mounted within said bore of said sleeve; and fastener attaching said shaft to said steering wheel.

8. The steering wheel of claim 7 further comprising:

a first locking shaft formation positioned along said tapered portion of said shaft.

9. The steering wheel of claim 8 wherein:

said first locking shaft formation is defined by a flat configuration which is congruent with a directly contacting against said first locking sleeve formation for acting in concert therewith.

10. The steering wheel of claim 9 further comprising:

a second locking shaft formation defined by a flat configuration thereto positioned along said otherwise tapered portion of said shaft radially opposite from said first locking shaft formation, said second locking shaft formation being congruent with said second locking sleeve formation proximate thereto for acting in concert therewith.

11. The steering wheel of claim 7 wherein:

said shaft has an internally threaded aperture extending therein open to said distal end thereof.

12. The steering wheel of claim 11 wherein:

said fastener is a bolt having a shank threaded congruent with said internally threaded aperture of said shaft for engagement therewith and having a head proximate with said inside face of said hub thereagainst when said bolt is fastened to said shaft therewith.

13. The steering wheel of claim 7 wherein:

said shaft has a step radially protruding therearound axially proximate with an intersection between said tapered portion and a nominal portion of said shaft, said step is diametrally larger than said inside surface of said sleeve therenear.

14. The steering wheel of claim 1 wherein:

at least a portion of said sleeve protrudes from said outside face of said hub.

15. The steering wheel of claim 1 wherein:

said taper along said inside surface of said sleeve decreases by at least 4.5 degrees as measured from a longitudinal axis therethrough with a smallest cross section being proximate with said inside face of said hub.

16. The steering wheel of claim 1 wherein:

said inside surface of said sleeve has said longitudinally oriented substantially frusto-conically tapered configuration running continuously therealong.

17. A steering wheel comprising:

a rim;

a plurality of spokes coupled to said rim;

a single piece metallic hub having an inside face and an outside face, said inside face being defined as substantially facing toward a rear portion of a vehicle, said plurality of spokes coupled to said hub solely through casting of said hub;

a metallic sleeve mounted upon said hub with a portion of said sleeve protruding from said outside face of said hub, said sleeve and said hub having an inside surface with a longitudinal bore, at least a portion of said inside surface of said sleeve further having a longitudinally oriented tapered configuration, said tapered portion being longitudinally disposed within a section of said bore closest to said inside face, said sleeve being created as a single piece with said hub and being comprised of the same material;

a first locking sleeve formation positioned along said tapered inside surface of said sleeve, said first locking sleeve formation defined by a flat configuration spanning inside a segment of said tapered inside surface of said sleeve, said first locking sleeve formation longitudinally extending along a portion of said inside surface of said sleeve adjacent to said inside face of said hub; and a second locking sleeve formation defined by a flat configuration positioned along said tapered inside surface of said sleeve radially opposite from said first locking sleeve formation, whereas said inside surface of said sleeve longitudinally proximate with said first and second locking sleeve formations is defined by a pair of radially opposing flat segments joined by a pair of radially opposing partially circular segments of said taper.

18. The steering wheel of claim 17 wherein:

a portion of said sleeve protrudes from an outside face of said hub.

19. The steering wheel of claim 17 wherein:

said sleeve and said hub are cast from a magnesium based material.

20. The steering wheel of claim 17 wherein:

said sleeve and said hub are cast from an aluminum based material.

21. The steering wheel of claim 17 wherein said taper along said inside surface of said sleeve decrease by at least five degrees as measured from a longitudinal axis with a smallest cross section being proximate with said inside face of said hub and said inside surface of said sleeve having said longitudinally oriented frusto-conical tapered configuration running continuously therealong.

22. The steering wheel of claim 17 further comprising:

a shaft having a substantially tapered portion proximate with a distal end, said tapered portion being insertably mounted within said bore of said sleeve and a fastener attaching said shaft to said steering a wheel.

23. The steering wheel of claim 22 further comprising:

a first locking shaft formation positioned along said tapered portion of said shaft.

24. The steering wheel of claim 23 wherein:

said first locking shaft formation is defined by a flat configuration which is congruent with and directly contacting against said first locking sleeve formation.

25. The steering wheel of claim 24 further comprising:

a second locking shaft formation defined by a flat configuration positioned along said tapered portion of said shaft radially opposite from said first locking shaft formation, said second locking shaft formation being congruent with said second locking sleeve formation.

26. The steering wheel of claim 22 wherein:

said shaft has an internally threaded aperture open to said distal end.

27. The steering wheel of claim 26 wherein:

said fastener is a bolt having a shank threaded congruent with said internally threaded aperture of said shaft for engagement therewith and having a head proximate with said inside face of said hub when said bolt is fastened to said shaft.

28. The steering wheel of claim 22 wherein:

said shaft has a step radially protruding therearound axially proximate with an intersection between said tapered portion and a nominal portion of said shaft, said step is diametrally larger than said inside surface of said sleeve.

\* \* \* \* \*